United States Patent [19]

Bet-Esh et al.

[11] Patent Number: 4,728,808

[45] Date of Patent: Mar. 1, 1988

[54] UNINTERRUPTIBLE POWER SUPPLY SYSTEM

[76] Inventors: Ran Bet-Esh, 3 Hess Street; Rina Kavia, Borochov Str. 8, both of Jerusalem, Israel

[21] Appl. No.: 837,818

[22] Filed: Mar. 10, 1986

[30] Foreign Application Priority Data

Mar. 13, 1985 [IL] Israel .................................... 74582

[51] Int. Cl.$^4$ ................................ H02J 9/06
[52] U.S. Cl. ................................. 307/66; 307/64
[58] Field of Search ............... 307/64, 65, 66; 363/17

[56] References Cited

U.S. PATENT DOCUMENTS

| | | | |
|---|---|---|---|
| 4,220,872 | 9/1980 | Fahey | 307/66 |
| 4,225,792 | 9/1980 | Fahey | 307/66 |
| 4,298,926 | 11/1981 | Black | 363/17 |
| 4,488,057 | 12/1984 | Clarke | 307/66 |
| 4,560,886 | 12/1985 | Ferguson | 307/64 |

Primary Examiner—William M. Shoop, Jr.
Assistant Examiner—Richard K. Blum
Attorney, Agent, or Firm—Holman & Stern

[57] ABSTRACT

An uninterruptible power supply system having input terminals connectable to an AC power source and leading to an AC to DC converter for producing a first DC voltage source and a second DC voltage source operationally connected to the first source. The system supplying at the output of the second source a voltage normally primarily provided by the first DC source. A capacitive accumulator device connected in parallel with a voltage sensing and controlling circuit and with the output of the two DC sources. The sensing and controlling circuit controlling the output of at least the second of the DC voltage sources so as to provide at the output terminals of the system a substantially constant output voltage also when the AC power source to which the system is connected in interrupted.

8 Claims, 4 Drawing Figures

UNINTERRUPTIBLE POWER SUPPLY SYSTEM

The present invention relates to an uninterruptible power supply system or to a battery backup system, for maintaining a substantially constant DC or AC supply to a load.

BACKGROUND OF THE INVENTION

There are known several types of uninterruptible power supplied (UPS), the most common of which are the "on-line" and "off-line" UPS. The "on-line" UPS is essentially composed of a battery charger powered by the AC line, a storage battery and an inverter for converting the DC voltage from the battery to an AC voltage to a load. The disadvantages of this kind of arrangements are the high cost of the controlled battery charger, which, in addition, is also a cumbersome device, and the relatively low efficiency of the arrangement.

The "off-line" UPS is a slightly more sophisticated arrangement wherein, in addition to the "on-line" components, it also comprises an AC voltage monitor and control circuit. The "off-line" UPS is thereby synchronized with the frequency and phase of the line and during normal operation, the load is powered directly by the line. When the AC line voltage drops below a predetermined level, or is altogether cut off, the "off-line" UPS automatically comes on line. The switch over time is of at least 5 msec. This minimal transit time of 5 msec. is a too long period for sensitive systems such as computers, and moreover, this "off-line" arrangement does not provide a constant output voltage but rather it merely follows the line fluctuations and, also, the switch-over action itself causes voltage fluctuations at the load.

SUMMARY OF THE INVENTION

It is therefore a broad object of the present invention to ameliorate the above disadvantages of the known UPS arrangements and to provide a system producing a substantially constant voltage output to be fed to a load and having practically no transit time, when voltage interruption of the AC input power line occurs.

Accordingly, there is provided an uninterrupted power supply system comprising input terminals connectable to an AC power source and leading to an AC to DC converter for producing a first DC voltage source, a second DC voltage source operationally connected to said first source, said system supplying at the output of said second source a voltage normally primarily provided by said first DC source, a capacitive accumulator means connected in parallel with a voltage sensing and controlling circuit and the output of said two DC sources, said sensing and controlling circuit controlling the output of at least the second of said DC voltage sources so as to provide at the output terminals of the system a substantially constant output voltage also when the AC power source to which the system is connected is interrupted.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a block diagram of a preferred embodiment of the system according to the invention;

FIG. 2 is a block diagram of a different embodiment of the system according to the invention;

FIG. 3 is a more detailed block diagram of the embodiment of FIG. 1; and

FIG. 4 is a circuit diagram of the UPS system of FIG. 3 according to the invention.

DETAILED DESCRIPTION OF THE INVENTION

Figure 1:
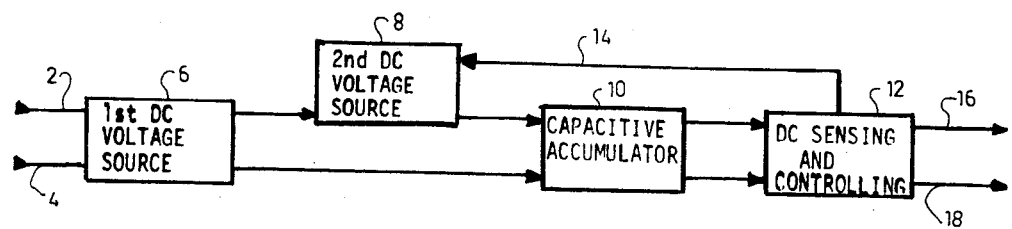

Referring to FIG. 1, there is shown a block diagram of an uninterruptible power supply (UPS) system according to the invention, comprising input terminals 2 and 4 connectable to an AC power source, e.g., a 110 V RMS or a 220 V RMS, leading to an AC to DC converter for producing a first DC voltage source 6. This source 6 is connected in series with a second DC voltage source 8, which second source 8 is, in turn, connected via a capacitive accumulator 10 to a sensing and controlling circuit 12. The latter is connected in circuit via line 14 for controlling the second DC voltage source 8. Output terminals 16 and 18 are connectable to a load.

Figure 2:
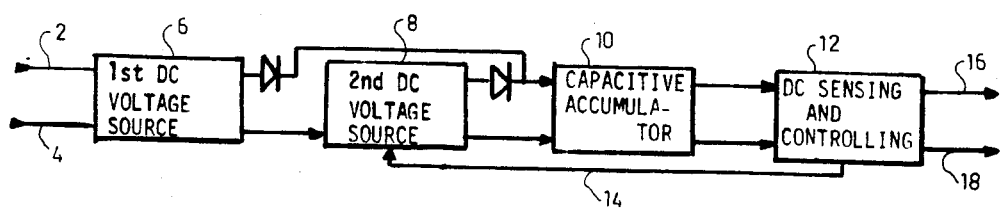

A similar arrangement of a UPS system is shown in FIG. 2. For the sake of ease of understanding, the blocks and other circuit components which are identical to the blocks and components of FIG. 1, will be labelled with identical numbers. As it can be seen, according to this arrangement the second voltage source 8 is connected in parallel between the source 6 and the accumulator 10 via, respectively, blocking diodes 20 and 22 forming, in fact, an "OR gate"-type circuit.

Figure 3:
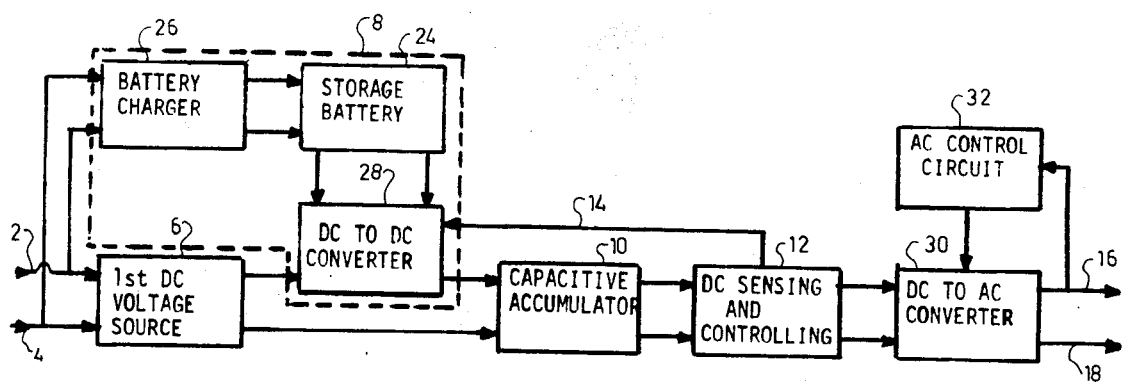

Turning now to FIG. 3 there is illustrated in block diagram form details of a preferred arrangement of the second DC voltage source 8. This source is composed of three parts: a storage battery 24 which is charged by a battery charger 26 powered by an AC (line) power, and a DC to DC converter 28. Also seen is a DC to AC converter 30 for converting the DC output from the circuit 12 to AC, if the load is an AC operatable load. The DC to AC converter is controlled by a control circuit 32 for providing a regulated output.

The operation of the UPS system of FIGS. 1 and 3 is as follows: When the system is connected to an AC power source, e.g., AC power line, the AC voltage is converted by any known per-se means into a DC voltage at a first source 6. The second DC voltage source 8, including the storage battery 24, is adapted to either supplement the first voltage source 6 or when it becomes necessary to replace the latter, in supplying the load with the predetermined DC or AC potential. While normally, for obvious reasons, the load is almost entirely fed by the voltage produced by the first source 6, any other setting of voltage ratios between the first and the second sources, could also be effected, provided that the required voltage output of the two sources will always be the sum of the two sources. Since the line power source is not entirely stable, the second DC source 8 and the capacitive accumulator 10 assures that any instantaneous small voltage fluctuations at the output of the two sources will be compensated or absorbed by this circuit. At the output of the system, the voltage level is constantly monitored or sensed and the sensing signal is applied as a control voltage to the second voltage source. Thus, any sensed deviation of voltage from a predetermined voltage level at the output is instantaneously corrected by the second, controlled voltage source, either by the supply of additional voltage to the load or by the reduction of its output voltage, so as to bring the sum total of the output voltage to its preset level. Should the line AC voltage be interrupted, the preset output voltage level will still be maintained solely by the second source.

The operation of the system according to FIG. 2 is slightly different. The load will always be fed by the source which produces an output of a higher potential. Thus when the line power is dropping or interrupted, the DC output from the first source will decrease below the output voltage of the second source. Hence the diode 20 will be blocked and diode 22 will conduct until the recovery of the first voltage source, and vice versa.

Figure 4:
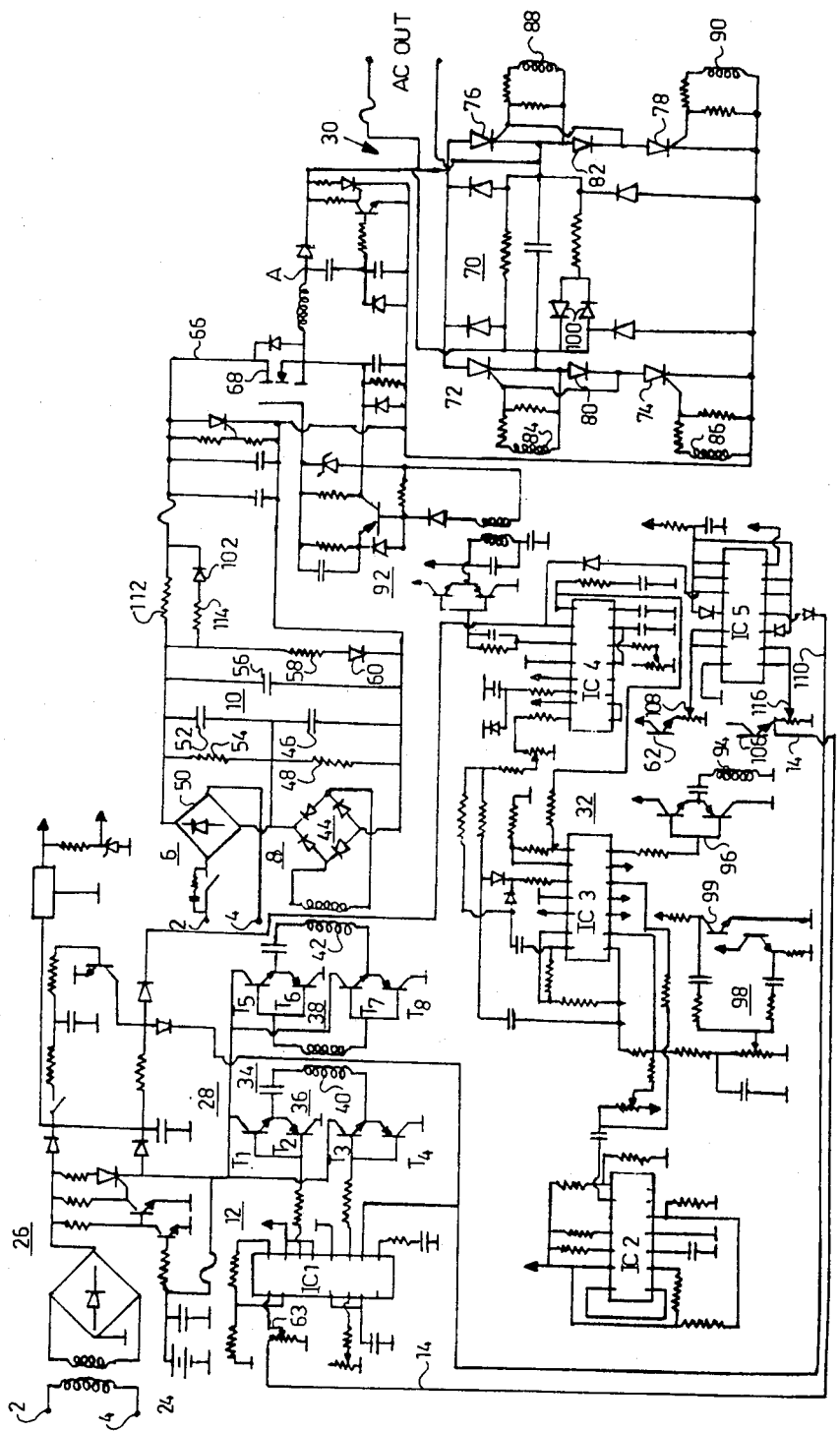

Referring now to FIG. 4 showing an embodiment of a complete circuit diagram of the UPS system of FIG. 3 in detail, in the following there will be described the main features of this circuit.

The input terminals 2, 4 lead, as mentioned hereinbefore and seen also in FIG. 3, to both, a known per-se AC to DC converter 6 as well as to a common battery charger 26 connected in-circuit for charging the storage battery 24.

The controlled DC to DC converter 28 is especially suitable to provide high power output at high efficiency when fed by a relatively low voltage. For this purpose the circuit 34 includes two transistor bridges 36 and 38 wherein the transistors are arranged and driven in a complementary symmetric fashion. As seen, the driving stage effected by the bridge 36, composed of transistors $T_1$, $T_2$, $T_3$ and $T_4$ and constituting a power amplifier is adapted to drive the bridge 38, composed of transistors $T_5$, $T_6$, $T_7$ and $T_8$, via step-up transformer 40. The output of the bridge 38 feeds a transformer 42, the output of which transformer is fed to a circuit composed of a bridge 44, a capacitor 46 and resistor 48 which is connected in series with the circuit of the source 6 composed of a diode bridge 50, the capacitor 52 and of the resistor 54. This combination of the two voltage sources provides a voltage which is advantageously normally primarily composed of the first source 6 and is supplemented by the second DC source 8 to bring up the voltage level to the required voltage of the load.

In order to prevent any small fluctuations in the sources output voltage, eminating from slight variations of line voltage and from voltage spikes which are sometimes introduced in the main power line, there is provided an accumulator composed of a capacitor 56 which is connected across the voltage sources 6 and 8.

Across the capacitor 56 is connected a resistor 58 in series combination with a photo diode 60, the latter constituting one part of an optocoupler unit which also includes the phototransistor 62. At the output of the phototransistor 62 is thus obtained a potential which is proportional to the sensed voltage at the output of the two DC voltage sources. This sensing voltage, which constantly monitors and follows the system's output voltage is transferred to the input of the controlling circuit 12 via the line 14 and the potentiometer 63 for setting the required output voltage of the system. Ic1 works in the negative feedback mode, namely, as the input voltage decreases, the width of the output pulse increases, hence the controlling output pulses of the IC1 circuit, which are proportional to the DC output voltage of the system, are fed to the driving bridge 36 of the second DC source 8, thus achieving the control of the output voltage of the system.

If the system is to supply an AC operatable load, the DC output is converted to AC by means of the converter 30 controlled by the circuit 32 (see FIG. 3).

The DC to AC converter 30 acts as follows. DC voltage is fed via lead 66 to a switching element 68 forming at point A a sinusoidal rectified voltage. This voltage is applied to the bridge circuit 70 comprising the SCR's 72, 74, 76 and 78 interconnected via diodes 80 and 82, which transforms the illustrated input voltage into an AC voltage as it is known per se. As further seen, the circuit 70 comprises secondary windings 84, 86, 88 and 90 which constitute the coupling means for the AC control circuit 32. The control signal is produced in a first circuit IC2, which forms a sinusoidal sine wave which is transformed into a rectified form by IC3 and modulates (pulse width modulation) the pulsed signals produced by IC4. The thusly obtained pulse width modulated signal is applied by IC4 to the driving amplifier and clamp circuit 92 controlling the switching element 68.

In order to assure that one branch of the bridge 70 will not be shorted out when the two SCR's on one branch do not work in complete synchronization, diode 80 or respectively 82 will clamp the triggering gate voltage of the "upper" SCR under the SCR's cathode voltage, thus preventing the SCR's ignition until the other "lower" SCR's in the same branch will stop conducting. Furthermore, the diodes 80 and 82 also provide a defined voltage in which the SCR's will stop conducting even in case that a small DC voltage will be present at point A.

IC3 also produces a square wave which is synchronous with the sine wave formed by IC2 for the synchronous operation of the DC to AC converter 30. This controlling square wave is applied to the converter's secondary windings 84, 86, 88 and 90 via the primary winding 94, driven by driving circuit 96. In addition, IC3 also comprises a feedback circuit 98 for controlling the voltage at the AC output of the system. This control is achieved by the optotransistors 99 constituting a part of the sensing optocoupler, the other part of which is constituted by the diodes 100 at the converter 30.

The function of the IC5 circuit is to provide the necessary voltage and current protection of the circuit. The DC output voltage is constantly monitored by the circuit composed of the photo-diode 60 in combination with the resistor 58. As current flows through the phototransistor 62 there is developed a voltage thereacross, the level of which voltage is determined, interalia, by the setting of the potentiometer 108. If the voltage level is higher then a predetermined threshold, IC5 will be pulsed and feed a signal to IC1 via a "shut down" line 110. IC1 will in turn, switch off the operation of the inverter 28 and IC4. The latter ceases the operation of the switches element 68 for a duration which is required for decreasing the output voltage level.

Opto-diode 102, the opto-transistor 106 constituting in combination an optocoupler, with resistor 112 and 114. Similarly to the voltage protection circuit described hereinbefore, the setting of the potentiometer 116 determines the threshold voltage relating to the current which flows through resistor 112 and in turn, switches off the operation of the system.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An uninterruptible power supply system comprising input terminals connectable to an AC power source and leading to an AC to DC converter for producing a first DC voltage source, a second DC voltage source operationally connected to said first source, said system supplying at the output of said source a preset voltage normally primarily provided by said first DC source, a capacitive accumulator means connected in parallel with a voltage sensing and controlling circuit and the output of said two DC sources, said sensing and controlling circuit sensing the output of said first DC voltage source and controls the output of at least the second of said DC voltage sources, the arrangement being such that when the voltage of said first DC voltage source deviates from a predetermined value, the difference between said preset voltage of the system and the voltage supplied by said first DC voltage source is provided by said accumulator means until said second DC voltage source supplies said difference.

2. The system as claimed in claim 1 wherein said second DC voltage source is connected in series between said first DC voltage source and said capacitive accumulator means.

3. The system as claimed in claim 1 wherein said second DC voltage source is connected in parallel between said first DC voltage source and said capacitive accumulator.

4. The system as claimed in claim 1 further comprising a DC to AC converter connected at the output of said voltage sensing and controlling circuit and a control circuit for monitoring and controlling the output of the DC to AC converter to a load.

5. The system as claimed in claim 1 wherein said second DC voltage source comprises (a) a storage battery fed by a battery charger powered from an AC power source, and (b) a DC to DC converter.

6. The system as claimed in claim 1 wherein said sensing circuit comprises optocouplers.

7. The system as claimed in claim 1 wherein said DC to DC converter comprises a transistor bridge arranged and driven in a complementary symmetric fashion.

8. The system as claimed in claim 1 further comprising voltage and current protecting circuit.

* * * * *